July 9, 1963

J. E. GILLILAND ETAL 3,097,063

HYDROGEN FLUORIDE DETINNING PROCESS
AND PRODUCTION OF STANNOUS FLUORIDE

Filed Feb. 8, 1960

Joe E. Gilliland
Raymond Ray
Wayne E. White
INVENTORS.

BY
ATTORNEY.

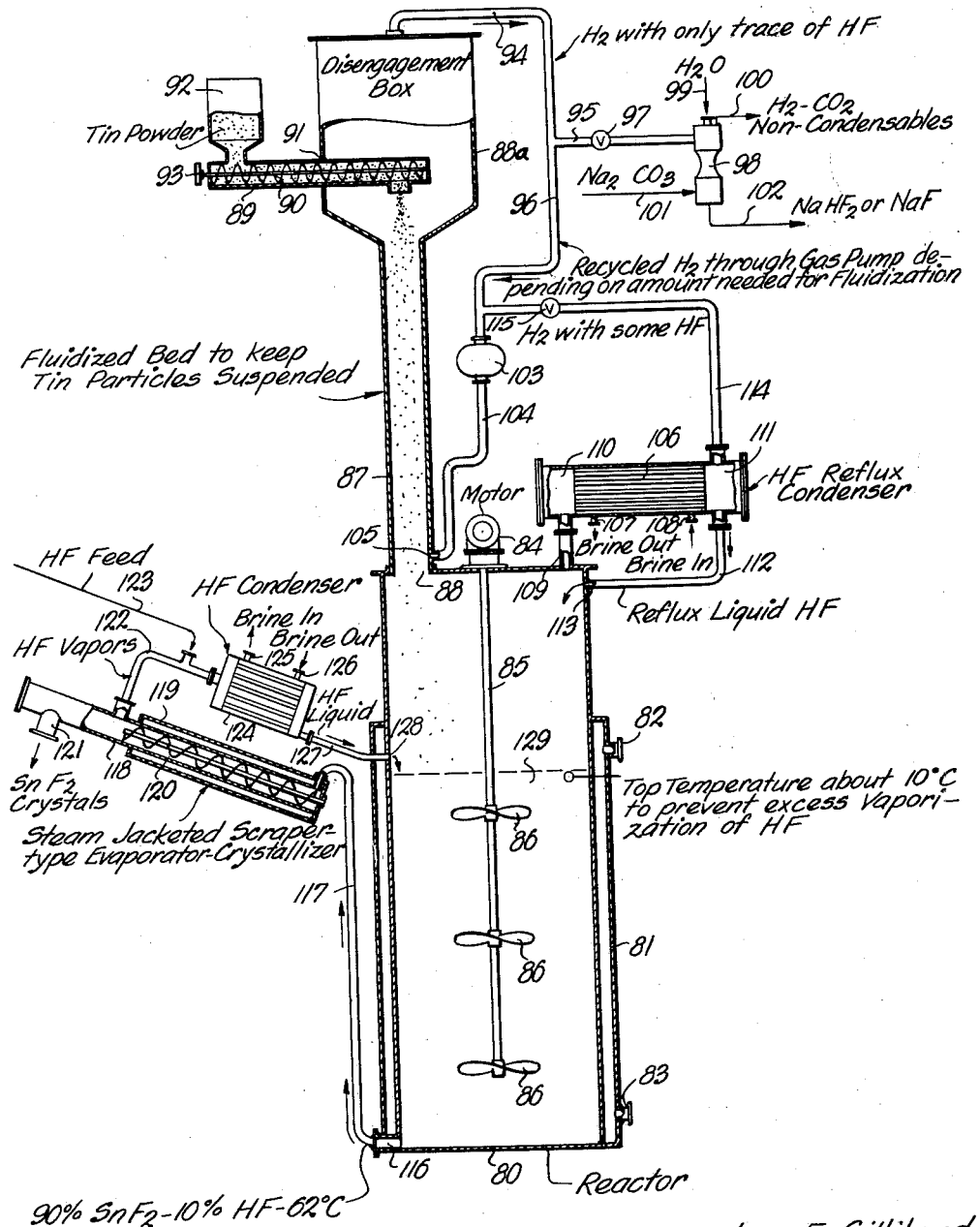

United States Patent Office 3,097,063
Patented July 9, 1963

3,097,063
HYDROGEN FLUORIDE DETINNING PROCESS AND PRODUCTION OF STANNOUS FLUORIDE
Joe E. Gilliland, Raymond Ray, and Wayne E. White, Tulsa, Okla., assignors to Ozark-Mahoning Company, Tulsa, Okla., a corporation of Delaware
Filed Feb. 8, 1960, Ser. No. 7,388
7 Claims. (Cl. 23—88)

This invention relates to methods of controlling the chemical reaction of tin and hydrofluoric acid and refers more particularly to methods of controlling such reaction in the production of stannous fluoride and in detinning of metal plated with tin.

This application is a continuation-in-part of our application Serial No. 610,890, filed September 20, 1956, for "Method of Production of Stannous Fluoride," now Patent 2,924,508, and is also a continuation-in-part of our application Serial No. 680,185, filed August 26, 1957, for "Method of Production of Stannous Fluoride," now U.S. Patent 2,955,914.

Detinning Tin Plate

According to current authority (The Encyclopedia of Chemical Technology, vol. 14, page 151 ff., "Tin Plate") the basic raw material for the can manufacturing industry is sheet steel of usually .01 inch thickness with a coating of pure tin averaging less than 1 percent of the weight of the steel. This tin makes the scrap unsuitable for return to steel furnaces as well as providing a material of importance as a source of tin metal. Samples of commercial tin plate recently investigated range from one including approximately 2 percent tin having a thickness of about 0.00012 inch (tin plate used on 5 and 10 gallon milk cans, for example) and one including approximately 0.25 percent tin having a thickness of approximately 0.000015 inch.

The largest single commercial use of tin is as tin plate and, of this, approximately 10 to 15 percent goes into scrap. In 1952, 2,952 short tons of tin were recovered as metal and 350 short tons as tin compound; this is from scrap tin plate.

It should be noted that scrap tin plate is much more valuable as a source of heavy melting scrap steel than as a source of tin. Such scrap steel, after detinning, is worth about $40.00 per ton and the amount of tin recoverable from one ton of scrap tin plate is worth about $10.00 or less.

Since the middle of the 19th century, a very large number of patents have been issued covering detinning processes and equipment. Three processes have accounted for nearly all commercial detinning: (1) Alkaline Electrolytic Process, (2) Chlorine Process and (3) Alkali Chemical Process. The one presently used most extensively, apparently, is the Alkali Chemical Process wherein the scrap is treated with a hot solution of caustic soda in the presence of an oxidizing solution of sodium nitrate or nitrite, in which the tin is dissolved as sodium stannate. The steel is not affected.

Objections to the conventionally known processes are several. In the first place, the reaction is not as rapid as might be desired. Secondly, the reactions involving chlorine are not as selective as might be desired. In the third place, it would be very desirable to develop a continuous process over the present processes which are believed to be largely batch. In the fourth place, tin plate is most often lacquered. The composition of this lacquer varies markedly, as well as its thickness. In known processes, special caustic treatment is required to remove the lacquer before the conventional processes of detinning are applied. The addition of the extra process of caustic treatment to remove the lacquer is undesirable. Other objections as to cost, inconvenience and recoverability of the tin from the detinning vats exist and, additionally, the objection that the first product of the present detinning process must be transformed in part at least, to other forms which are then usable. For example, if sodium stannate is crystallized out, it may be electrolyzed to tin which is then made into stannous chloride.

Stannous Fluoride Production

Stannous fluoride is presently of great commercial interest as an additive for dentifrices to supply fluorine values to human teeth for the purpose of reducing the incidence of dental caries.

The only method for making stannous fluoride given in the literature involves the dissolution of stannous oxide in aqueous hydrofluoric acid. This reaction has been developed so as to be able to obtain therefrom high purity stannous fluoride of the character required to investigate its character in minimizing dental caries incidence. However, in this reaction, conditions of concentration, temperature and other factors have proved to be of the utmost importance in obtaining a complete interaction of the two reactants. It has also been found quite easy to miss the ideal conditions and, in such case, the stannous oxide would not be completely dissolved in the acid. Even under the best conditions in this reaction, it is usually necessary to clarify the solution in order to obtain from it a white, pure salt of stannous fluoride.

In addition to the apparent criticality in conditions for the reaction, other disadvantages have been encountered in the dissolution of stannous oxide in hydrofluoric acid. Filtration of the solution frequently is difficult and slow. The cost of tin in the form of stannous oxide is relatively high. For example, we have recently priced stannous oxide at $1.84 per pound for the tin in comparison to a tin metal price of $1.00 per pound. Additionally, the available commercial sources of stannous oxide are severely limited as compared to the ready sources of metallic tin.

Because of the above many objections regarding the use of stannous oxide in making stannous fluoride, we have sought an alternative method of preparation of stannous fluoride. In our patent applications Serial No. 610,890 and Serial No. 680,185, we have demonstrated the reactivity of concentrated hydrofluoric acid and tin and the solubility of stannous fluoride in concentrated hydrofluoric acid. These procedures and processes were developed in spite of the fact that the literature clearly indicated that such a method was impractical. (Not only were all of the methods described in the literature for the production of stannous fluoride specific in designating the use of stannous oxide, but, also, many statements in standard literature references indicated the futility of attempting to prepare stannous fluoride directly from metallic tin.) In Serial No. 610,890, we disclosed a method of dissolving finely divided metallic tin in an excess of liquid hydrofluoric acid in measured quantities to produce stannous fluoride. In Serial No. 680,185, we disclosed a process permitting the addition of the acid to the tin. In each case, it was necessary to solve serious problems of control of the reaction temperature below the melting point of tin in order to avoid the agglomeration into unreactive metal masses of tin to be dissolved.

Objects

Therefore, an object of the invention is to provide an extremely rapid process of removing tin coating from plated metals which are themselves unreactive toward hydrogen fluoride.

Another object of the invention is to provide a process for removing tin coating from plated metals which are themselves unreactive toward hydrogen fluoride which is more selective than any of the other acidic agents described in the literature.

Another object of the invention is to provide a process for removing tin coating from plated metals which are themselves unreactive toward hydrogen fluoride which permits the use of a continuous process or a batch process, alternatively.

Yet another object of the invention is to provide a process for removing tin coating from metals plated with lacquered tin which are themselves unreactive toward hydrogen fluoride, said process not requiring an extra caustic removal step before the detinning step.

Another object of the invention is to provide a method of removing tin coatings from plated metals which are unreactive toward hydrogen fluoride, said method sufficiently and quickly removing the tin, the tin being dissolved in hydrogen fluoride in the form of stannous fluoride, the latter easily and simply recoverable from the HF.

Another object of the invention is to provide a process for removing tin coatings from plated metals which are unreactive toward hydrogen fluoride, which reaction is in all respects readily controllable to many varied reaction environments as desired by regulating the withdrawal of the stannous fluoride-HF containing bath liquid and input of fresh hydrogen fluoride.

Another object of the invention is to provide a process of controlling the reaction between tin and hydrofluoric acid wherein dropping of the temperature of the reactant acid to a critical level permits the control of the reaction step in initially contacting the reactants in such fashion as to markedly enhance the chance of success in the entire reaction.

Another object of the invention is to provide a method of producing stannous fluoride from the reaction of HF and metallic tin wherein the problems of temperature control, ordinarily critical in such reaction, are avoided by the manner of presenting the tin to the HF.

Another object of the invention is to provide a continuous method of producing stannous fluoride from the reaction of HF and tin wherein temperature control of one of the reactants at the initiation of the reaction and bringing together of the reactants in combination with control of the HF-$SnF_2$ ratio in the reactant bath after the reaction is initiated minimizes the problems of temperature control in the reaction process and makes much more feasible a continuous reaction process.

Another object of the invention is to provide an optimum method for producing stannous fluoride which also permits detinning metals plated with tin which are unreactive with hydrogen fluoride under the conditions of the HF-tin reaction.

Another object of the invention is to provide a method of producing stannous fluoride or of removing tin coatings from plated metals involving the immersion of tin plate in a bath of HF containing liquid, wherein a minimum quantity of HF is lost in the form of reactant vapors either from the reaction bath or detinned plate and wherein a maximum quantity of stannous fluoride is recovered from the process.

Still another object of the invention includes obtaining a scrap steel of good quality, free of tin, obtaining as a direct product a salt of commercial value (stannous fluoride) and providing a means of recovering hydrogen fluoride in the inventive process which might otherwise be lost along with hydrogen produced in the reaction.

Other and further objects of the invention will appear in the course of the following description thereof.

In the drawings, which form a part of the instant invention and are to be read in conjunction therewith, embodiments of the invention and inventive process are shown and, in the various views, like numerals are employed to indicate like parts.

FIG. 3 is a schematic flow diagram of the inventive process showing a continuous method of producing stannous fluoride from metallic tin particles.

*Detinning of Tin Plate (FIG. 1)*

Figure 1:
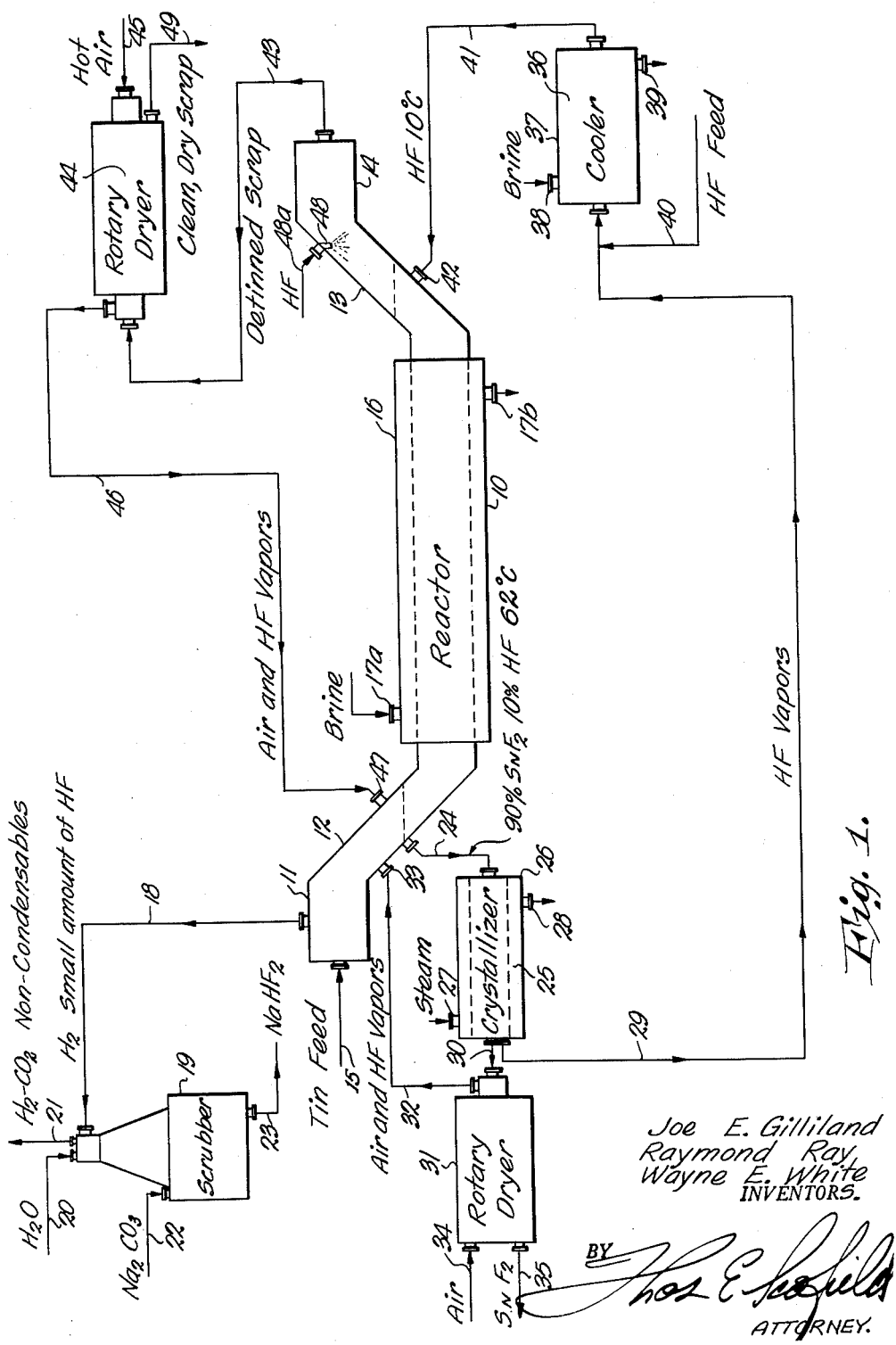
FIG. 1 is a schematic flow diagram of the inventive process showing an apparatus arrangement best adapted to permit the practice of the invention in removing tin coatings from plated metals or in utilizing tin plate as the tin source in the production of stannous fluoride.

Referring first to FIG. 1 and the removal of tin coatings from plated metals or the detinning practice, at 10 is designated the lower central body portion of a reaction vessel having a horizontally oriented input section 11, downwardly inclined secondary section 12, an upwardly inclined removal section 13 and a substantially horizontal discharge section 14. Tin feed is schematically indicated at 15, plate or powder. A heat exchanging jacket 16 having inlet 17a and outlet 17b encloses the major portion of the lower reactor portion 10.

Referring to the upper left-hand corner of the flow sheet, gas output flow line 18 passes vapors of hydrogen, generally with a very small amount of included HF, to scrubber 19. Water is input to scrubber 19 through line 20, while hydrogen, carbon dioxide, and noncondensable gases are taken off above through line 21. $Na_2CO_3$ is input to the discharge chamber of scrubber 19 through line 22, while $NaHF_2$ or NaF solution is withdrawn through line 23.

Discharge line 24 passes from the liquid level of tin feed section 12 of the reactor to evaporator-crystallizer 25. Vessel 25 has steam jacket 26 thereon with input and output steam lines 27 and 28. In vessel 25, the solution of HF-$SnF_2$ is heated to drive off HF vapors through line 29. From vessel 25, the stannous fluoride retaining traces of HF is passed through line 30 to rotary dryer 31. From dryer 31, vapors of HF are recycled by line 32 to fitting 33 on the input end of the reactor 10 above the liquid level. Purge gas (air or an inert gas) for the rotary dryer is furnished through line 34. Product stannous fluoride is withdrawn from dryer 31 by means schematically shown at 35.

HF vapors are passed through line 29 to cooler 36 having brine jacket 37 with input and output lines 38 and 39. Fresh HF, in the desired concentration, is fed in through line 40 to join line 29 before cooler 36. From cooler 36, the HF at approximately 10° C. is passed through line 41 to input fitting 42 at the outlet side of the reactor, but below the liquid level therein.

In the case where tin plated metal is the source of tin, detinned scrap iron or the like may be removed from discharge end 14 of the vessel through suitable means schematically designated by line 43 and passed to rotary dryer 44 of the same character as dryer 31. Air or inert purge gas passed into dryer 44 through line 45 picks up any HF carried in on the detinned metal, which vapors are passed through line 46 to fitting 47 on the input inclined section 12 of the reactor above the liquid level therein.

Schematically designated at 48 is an optional step where the detinned metal is sprayed with liquid HF input through line 48a above the reactor liquid level to remove any stannous fluoride crystallized on the metal, with the sprayed wash HF, together with any stannous fluoride picked up thereby being added to the liquid in the reactor.

Scrap metal, detinned, HF-free, and stannous fluoride-free, is removed from the rotary dryer at 49.

The apparatus of FIG. 1 is primarily designed for operation in the process of detinning tin plate. It may be used in the continuous production of stannous fluoride utilizing metal particles of tin as the tin source. However, the apparatus of FIG. 3 is more important in this regard. While the detinning practice produces stannous fluoride of sufficient purity for commercial use, and while such stannous fluoride is an important by-product, the primary purpose is the detinning process to make available tin-free scrap. This process will be presently considered. In the system of FIG. 1, three features of the procedure are of considerable importance. These will be individually considered.

In the first place, the scrap tin plate is fed into the reactor 10 in such manner that baskets or other suitable containers containing the scrap or the scrap bundles are passed through the ascending vapors of hydrogen and HF whereby to pick up the HF vapors and permit the substantial reaction of the tin with the HF in vapor form before the plate reaches the liquid reaction body in reactor 10. The reaction is completed in the liquid HF-stannous fluoride solution. It is very important to minimize in this manner the quantity of HF passed over to the scrubber 19.

Optionally, a thick renewable bed of scrap may be positioned by suitable mechanism (not shown) above the liquid body in reactor 10 with new scrap added periodically thereto and the scrap bed substantially filling the cross section of the reactor. Such a bed will effectively screen and pick up the HF vapors from the liquid body below. Periodically, with removal of the scrap from the liquid body below, the scrap bed above the liquid body may be lowered thereinto and another bed built-up begun thereabove.

The second feature of the FIG. 1 system is the maintenance in the liquid body of the reactor, of a solution of HF and stannous fluoride with sufficient stannous fluoride present in solution to raise the boiling point of the solution to a level that a large percentage of the HF is not flashed off merely because of the temperature of the scrap entering the liquid body. If too much HF is flashed off merely by the temperature of the scrap itself, rather than the exothermic reaction, the tin on the scrap passing downwardly will not be adequate in combining with all the HF. As an alternative to or for use in conjunction with the ratio control of HF-SnF$_2$ in the reactor 10, a suitable quantity of brine or other coolant may be passed into the jacket 16 to so control the temperature of the body of liquid in the reactor 10 as to slow down the reaction rate. When the temperature differential between the scrap entering the liquid body and the liquid body itself is fairly great before such cooling, such cooling is often economically useful in addition to the ratio control. Thus, it is possible to control the detinning reaction and HF evolution to some extent by cooling through jacket 16. However, this is not preferable as the reaction is then so slowed as to delay the detinning process.

The third feature of the FIG. 1 process relates to the wash step at 48 wherein the detinned scrap is optionally sprayed with fresh HF whereby to free the detinned scrap metal of any crystallized dissolved stannous fluoride which may have adhered to the metal. This wash liquid passes into the liquid body in the reactor. The scrap is freed from any wash HF in the rotary dryer 44 with HF vapors returned through line 46 immediately above the reactor input liquid level. In this manner, conservation of both stannous fluoride and HF are accomplished with effective cleaning of the scrap.

While passage of HF vapors, particularly anhydrous HF vapors, through the scrap will generally detin unlacquered scrap, the time required for such detinning in some cases is excessive to that desired, that is, requiring over 15 minutes to remove 80 to 85 percent of the tin. (Ten minutes of such vapor treatment generally removes 70 to 75 percent of the tin.) Therefore, even in the case of unlacquered tin, it is optimum to immerse the plate in the liquid. In the case of lacquered tin scrap, the tin may be immersed in the reaction liquid for a sufficient time to remove all of the lacquer and tin. If the reactor itself is heated by passing a warming fluid, such as steam in controlled amounts, through jacket 16, this reaction can be speeded, but such procedure results in excessive amounts of HF at line 18. The instant process will handle all types of lacquer on tin if sufficient time is allowed. The reaction proceeds best with acid approaching or at anhydrous condition.

The following table shows the difference in extents of reaction and temperature of the reaction step for lacquer-free tin placed in different composition mixtures of SnF$_2$-anhydrous HF for four minutes:

| Composition (By Weight) | Reaction, percent | Temperature, ° C. |
| --- | --- | --- |
| 80% HF–20% SnF$_2$ | 100 | 27 |
| 60% HF–40% SnF$_2$ | 100 | 27 |
| 40% HF–60% SnF$_2$ | 100 | 43 |
| 20% HF–80% SnF$_2$ | 90 | 57 |

A 90–10 SnF$_2$-HF ratio has been found the highest advisable with the SnF$_2$ concentration best held at a somewhat lower value than this, if feasible.

Other comments on the system of FIG. 1 may be made as follows: In the first place, liquid anhydrous HF rapidly and completely removes tin from lacquer free tin plate (15–30 seconds). The tin removal from lacquered tin plate with liquid HF is slower (30 minutes–2 hours). HF vapors are effective at 66° C. in tin removal from lacquer free tin plate (10 minutes). Tin removal from lacquered tin plate is slower and sometimes not complete using HF vapors.

If it is desired to use a caustic treatment, a one percent (1%) caustic (NaOH) solution will remove the lacquer from the tin plate and the tin is then swiftly removable as previously noted. HF is easily purged from detinned scrap iron at elevated temperatures (93° C.). The detinned scrap iron does oxidize some but not any more than when it has not been exposed to HF. It appears that removal of lacquer presents as much or more of a problem than removal of the tin. However, concentrated HF does remove the lacquer and also the tin, although not as rapidly as unlacquered plate.

It has been conclusively established that the stannous fluoride produced in the process of FIG. 1 in the detinning of scrap tin plate is not significantly contaminated with iron.

In operation of the system of FIG. 1, hydrogen produced from the reaction, along with HF vapors from the liquid body and recycle lines 32 and 46 pass countercurrent to the incoming tin and by the time the gases leave the tin feed chute, they are virtually free of HF, the HF having reacted with the incoming tin. The tin plate feed enters the reaction medium where the stannous fluoride composition is 90 percent stannous fluoride–10 percent HF and the temperature of the mixture is 62° C. The reactor for the scrap tin plate is a continuous, countercurrent reactor. As the scrap tin plate travels through the reactor, it contacts a mixture becoming stronger in HF. By the time it reaches the HF end of the reactor, the tin optimally is completely dissolved and all of the stannous fluoride is washed off the detinned scrap. In a reactor where this is not the case, the HF wash at 48 is called for. Stannous fluoride with 10 percent HF to retain fluidity is discharged from the tin feed end of the reactor and placed in a steam jacketed scraper type evaporator-crystallizer 25. The HF is vaporized off and the stannous fluoride crystals with some HF vapors are discharged from the crystallizer into rotary dryer 31. The HF vapors from crystallizer 25 are condensed at 36 and the incoming HF through line 40 cooled in cooler 36 and fed into the reactor at a temperature of approximately 10° C. The detinned scrap and stannous fluoride crystals are placed in similar but separate dryers (of much difference in size) to remove residual HF vapors with air. The air along with HF vapors are passed countercurrent to the incoming tin to remove the HF vapors from the air. No problem is encountered whatsoever from local overheating and fusion of tin on acid contact due to the dispersion of the plated tin. The cooling and ratio control are employed to control HF flashing from the scrap temperature. HF concentration must be at least 70 percent to avoid attack on steel and expedite the reaction.

A treatment time of 30 to 40 minutes is required for complete tin removal in scrap tin plate with a tin layer thickness of 0.00012 inch.

Figure 2:
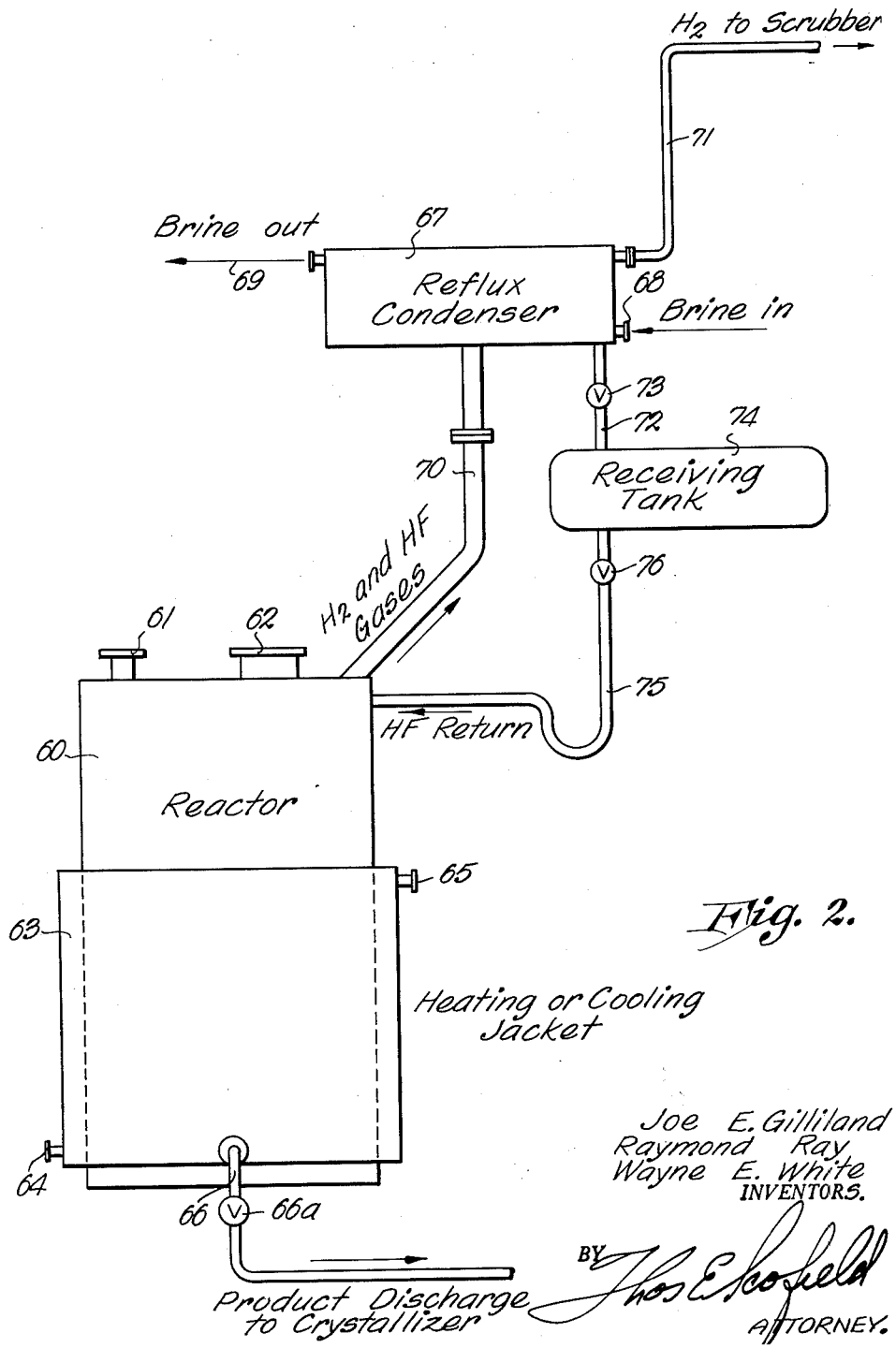
FIG. 2 is a schematic flow diagram of the inventive process applied in a batch method of producing stannous fluoride from metallic tin particles or metal plated with tin.

Batch SnF₂ Production With Tin Powder (FIG. 2)

Referring to FIG. 2, at 60 is shown a reaction vessel having input fittings 61 and 62 which may be sealed, heat exchanging jacket 63 with input and output connections 64 and 65 and bottom discharge line 66 controlled by valve 66a. Reflux condenser 67 has brine input and output fittings 68 and 69. Flow line 70 carries hydrogen gas and hydrofluoric acid vapors to the reflux condenser and withdrawal line 71 carries hydrogen gas to a scrubber (not shown). Flow line 72, controlled by valve 73, passes condensed hydrofluoric acid from the reflux condenser 67 to rundown tank 74 from which flow line 75, controlled by valve 76, returns the acid to the reactor.

The preferred procedure in reaction of the tin with the acid in vessel 60 will now be described. The seal on fitting 62 is removed and a charge of relatively finely divided metallic tin is poured into the reactor. The action and procedure with a tin source comprising metal plated with tin will be later described. The seal is then replaced and the tin optionally may be cooled by circulating cold brine or other low temperature heat exchanging medium through the jacket 63 which surrounds the lower part of the reactor in the manner of our Serial No. 680,185.

Substantially anhydrous hydrogen fluoride (at least 70 percent concentration) is cooled at least to a temperature substantially below the boiling point of the hydrofluoric acid at the pressures of the reaction step and preferably to about minus 15° C. The HF is then added to vessel 60 as rapidly as possible. By adding the cold HF rapidly to the mass of tin so that the whole mass of tin is quickly covered and contacted by the cold HF it is possible to avoid initially generating the heat which would cause the sintering and fusing which must be avoided in order to get an efficient reaction.

Once the cold concentrated HF has been added, the reaction initially moves rather slowly, but, as the temperature comes up to the boiling point of the HF, the velocity of the reaction increases, but never to an undesirable or uncontrollable extent so long as the variables of acid concentration, ratio of tin to acid, initial HF temperature, reaction step temperature and particle size of metallic tin are controlled as will be described. No trouble has been encountered from hydrogen evolution producing a froth which is carried out of the reactor.

The reflux condenser 67 cools the evoled vapors of hydrogen and acid and returns the condensed hydrogen fluoride to the reactor via rundown tank 74. The hydrogen is passed through a scrubbing tower (not shown) to remove any trace of hydrogen fluoride escaping the reflux condenser 67. The interaction of the tin and hydrogen fluoride with the production of hydrogen produces adequate mixing so that a mechanical mixer is not required. However, if it is desired to speed up the completon of the reaction, such mechanical mixing will aid, as the reaction otherwise slows down a good deal after an hour or two.

A typical time schedule for a charge of 250 pounds of powdered tin and 400 pounds of chilled anhydrous hydrogen fluoride, without mechanical mixing, requires a reaction time of about four hours after bringing the two reactants together. After this time, the hydrogen fluoride may be vaporized out as will be described later.

It should be pointed out that a most critical factor in the reaction is to maintain at least substantially the entire reaction step at a temperature below the melting point of tin and preferably substantially at the boiling point of the liquid present in the reaction step. The tin itself must be relatively finely divided and must not under any circumstances be permitted to accumulate enough heat in the exothermic reaction to bring the mass up to its fusion temperature. When the tin powder is first placed in the reactor and then the cold hydrogen fluoride poured thereon, the latter does not rapidly react when it first strikes the tin and, before sufficient heat is produced by the reaction to cause such trouble, sufficient volume of hydrogen fluoride is present in the reactor to serve as an adequate coolant.

The heat of reaction is dissipated through evaporation of the hydrogen fluoride or liquid in the reaction step. To prevent excessive vaporization loss of hydrogen fluoride, the reactor is equipped with the cold reflux condenser. The addition of the cold hydrogen fluoride preferably takes place within a period of five minutes and may be added partly from a tank retaining the residual amount from the preceding run, provided it is cooled as described and partly cold fresh acid. Once the HF, in the quantity desired, has been added to the reactor, with complete coverage of the whole mass of tin, the temperature differential between the reactor and the room within which it is placed and the exothermic heat from the initial reaction permits the temperature in the vessel to rise to the boiling point of HF at the reaction pressure (19.4° C. at atmospheric). The total quantity of hydrogen fluoride in the reactor at all times, as controlled by the amount of recycle from the reflux condenser, must be sufficient to maintain the temperature of the reaction below the melting point of tin and substantially at the boiling point of the solution in the reaction step. It should be point out that, as the reaction proceeds and tin goes into solution in the HF as stannous fluoride, the boiling point of the solution rises.

When hydrogen evolution becomes slow, the near completion of the reaction is indicated. The reaction may be completed within three to four hours depending upon various factors to be set forth. After completion of the dissolution of the tin, steam may be passed through jacket 63 and the excess hydrogen fluoride vaporized and collected in rundown tank 74 maintained for that purpose. Evaporation of the solution is continued until the liquid is at a temperature of about 65° C. at which point it retains 8 to 10 percent hydrogen fluoride, which is necessary to maintain fluidity which permits a clean discharge from the reactor.

The discharged strong solution is received in an aqueous solution of stannous fluoride solution, the filtrate from a preceding batch of crystals, or in an auxiliary closed, jacketed tank of an alloy resistant to both aqueous and anhydrous hydrogen fluoride from which the remaining hydrogen fluoride is vaporized. In the first case, the majority of the stannous fluoride from the reactor precipitates out in the aqueous solution until the whole is heated whereupon the salt is dissolved. The excess hydrogen fluoride in the solution is neutralized with stannous oxide and the solution is filtered and cooled to crystallize out the pure salt.

If the reactor is discharged into an auxiliary jacketed tank, the mixture of stannous fluoride and hydrogen fluoride is heated further to drive off additional hydrogen fluoride. The solid remaining is then taken up in hot aqueous stannous fluoride solution circulated through this auxiliary tank, which solution may be the filtrate from a preceding batch of crystals.

As an alternative method of recovering the stannous fluoride from the excess hydrogen fluoride remaining in the reactor after completion of the reaction, the contents of the reactor may be cooled sufficiently to crystallize out the stannous fluoride. The residual solution may then be decanted or otherwise removed from the crystal and stannous fluoride remaining in the reaction vessel and employed, if desired, for further use in the system by addition of an appropriate quantity of fresh hydrogen fluoride, if needed.

*Acid.*—We have found the concentration of the acid to be critical within a certain range. With the acid initially at minus 15° C., and with the acid needed to give a five to one acid-tin molar rate (stoichiometric ratio two to one), in a four hour period, anhydrous acid gave a 100 percent reaction, 90 percent acid gave 95 percent completion and 75 percent acid gave 54 percent completion.

We have observed slow reaction of tin and acid at concentrations of acid as low as 50 percent but not at lower concentrations. At 90 percent acid concentration, we have found that, in 16 hours, we can get all of the tin dissolved, that is, we have 100 percent completion. Thus, concentrations are important in determining the rate of reaction, the more the acid approaching the anhydrous state, the higher the rate. A very minimum acid concentration of 50 percent appears to be required for any measurable reaction. Adequate reaction, however, with steel vessel protection, is best achieved in the addition of chilled acid to tin in a process with the substantially anhydrous acid of over 70 percent concentration.

*Acid-in Ratio.*—We have found the ratio of acid to tin also affects the rate of completion of the reaction. We have found the upper limit for an effective reaction to be the temperature above which the finely divided tin agglomerates so as to reduce its surface area to a low value. Such agglomeration may consist of a slight sintering of the tin to give a somewhat less reactive mass or it may be a complete fusing so that a compact mass of metal is obtained which dissolves very slowly. When the tin powder is added to a large volume of anhydrous hydrogen fluoride, as in application Serial No. 610,890, the liquid acts as a coolant and the hydrogen evolved acts as a means of mixing. Under these latter conditions, the metal does not approach its fusing point because the hydrofluoric acid remains at or near its boiling point. However, when the acid is added to the tin, initial reaction may take place before enough liquid is present to maintain the tin temperature below its softening point. We have prevented such undesirable overheating in this instance by cooling the HF before adding it. When the temperature of the HF is reduced to minus 15° C. before its addition (in the ratio of 5 mols acid to 1 of tin), the tin dissolution was 100 percent completed in four hours. The most important thing is to prevent localized heating from the reaction. In practice, the optimum precooling of the acid is to minus 15° C.

*Reaction temperature.*—As to the temperature during the reaction, we have found the allowable temperature to be attained in the reaction mixture must be governed by the same general requirement as set forth previously, namely, the metal must not be permitted to reach, even at localized spots, the temperature where it will fuse together. The optimum reaction conditions employ anhydrous hydrofluoric acid, with the temperature controlled by acid recycle to remain at the boiling point of the liquid in the reaction step (including $SnF_2$ enriched solutions) at atmospheric pressure. However, we have operated at superatmospheric pressures and elevated temperatures below the melting point of tin with 75 percent concentration acid and have had reasonably good results.

*Tin particle size.*—As to the size of the particles in employing metallic tin, it is very difficult to indicate a nonreactive limit to the size of particles. A tin powder which passes 99 percent through 325 mesh is preferable because of its high rate of dissolution. A powder which passes 94 percent through 325 mesh is workable but slower in reaction. The reaction is very slow with −20 mesh tin granules. Clearly, the particle size relates primarily to the desired reaction rate.

*Condenser.*—The reflux condenser 67 preferably should be operative to cool the evolved gases passing thereto from the reactor 60 to a temperature of minus 15° C. or below, whereby to adequately inhibit untimely escape of the HF from the reaction chamber although affording to evolved hydrogen a relatively free exit therefrom. The condenser discharge passage into flow line 70 must be of sufficient capacity to allow for escape of the gaseous acid as well as the hydrogen evolved from the reaction. The return by gravity of relatively cold liquid HF from the reflux condenser, when the latter is kept at minus 15° C. or below, tends to counteract the heat generated in the exothermic reaction which otherwise might proceed with considerable violence if this or some other expedient were not employed for preventing overheating of the reaction vessel. The acid boils at about room temperature (19.4° C.) at atmospheric pressure and the reaction readily proceeds at approximately the slightly higher boiling point of the reacting mass when the conditions above are maintained. (The boiling point rises as the $SnF_2$ concentration increases.) Condensation of vaporized acid, together with cooling of escaped hydrogen, extracts from the system primarily only heat generated by the exothermic reaction.

*Reactor construction.*—It is evident to those skilled in the art that under certain conditions hydrogen fluoride is highly corrosive to materials of construction. In addition to the advantages already enumerated regarding the use of a highly concentrated hydrogen fluoride, a great convenience and economy is found in use of this reagent as ordinary steel can be employed for construction of reacting equipment when the HF concentration is above 70 percent. (The concentration of HF as 70 percent is exclusive of $SnF_2$, that is, we would never start with a "substantially anhydrous" HF having more than 30 percent water.) Aluminum may be satisfactorily used alone, but is more sensitive to the presence of water and consequently cannot be used in concentrations of hydrogen fluoride lower than about 95 percent. We have found also that polyethylene, silver and platinum are satisfactory for carrying out this reaction and the observation that these various materials of constructions can be used tends to negative the possibility that the reacting vessel has any catalytic effect in the reaction between the tin and hydrogen fluoride, which reaction it has heretofore been thought could not be carried to completion in respect to either the tin or hydrogen fluoride.

*$SnF_2$ solubility.*—It is believed that our discovery that stannous fluoride is soluble in excess of concentrated HF at about its boiling point has contributed materially to the success of our method in that, by virtue of the solubility of the reaction product ($SnF_2$) in the acid, the formation of the product in the reaction does not prevent continued reaction of the tin. If $SnF_2$ were insoluble in the acid, it would be expected to deposit at the site of production, that is, on unreacted tin, and thereby materially retard the dissolution of the remaining metal.

*Dental products.*—As the crystalline product attained by the practice for our method is soluble in cold water, it is apparent that it may be added to dentifrices in the manufacture thereof by a suitable or desired procedure in the proportions deemed appropriate for presenting on contact with the teeth of the consumer a proper concentration of a fluorine-bearing compound, nontoxic at concentration employed but adequate to reduce the incidence of dental caries, about .4 percent stannous fluoride in tooth paste and comparable concentration in other forms of dentifrices usually being considered adequate and not injurious to the health of the user.

*Batch $SnF_2$ Production With Tin Plate (FIG. 2)*

In the above description of the reaction of metallic tin particles in a finely divided state in the apparatus of FIG. 2, we have pointed out the necessity for having the tin in a reactive state as obtained through a high state of subdivision. We have also pointed out the necessity for keeping it in this high state of subdivision by preventing its agglomeration from excessive localized heating by the careful control of the reaction temperature. However, when one uses tin plated sheet steel, we have tin coated on the steel in very thin layers from .000015 to .00012, typically, so we have already in two dimensions a very finely divided tin. Additionally, the tin is automatically suspended in the reacting liquid by virtue of the presence of the plated metal so that the third dimension of dispersion is also automatically taken care of. Further, there is present a heat transfer and absorbing agent in the form of the plated metal so that there is no fear of temperature reaching the fusion point of tin. Since commercial practice is to apply film thicknesses of no more than about .000045 (we have found 5 and 10 gallon milk cans plated at 0.00012 inch) the previously described difficulty from sintering together or fusing together of tin particles through local heating in the case of tin plate is completely removed. It is doubtful that the temperature of the tin plate would ever be raised by the heat of reaction to the melting point of tin when the ratio of reactant (tin) to carrier (iron) is so low.

It is instructive to compare, as finely divided tin states, tin powder and tin plate. We have mentioned 20-mesh granular tin as being very slow to react. The openings of a 20 mesh screen are 0.033 inch. Even in the thicker tin coating of 0.00012 inch the thickness is only 0.3 percent of the smallest dimension of 20 mesh powder. With 325 mesh sieves, the openings of the screen are .0017 inch. We have thus discovered the equivalence for successful detinning and $SnF_2$ production of critically dimensioned tin plate and tin powder.

As stated above, we are sure that we will have no trouble from excessive temperatures in the case of tin scrap for either detinning or stannous fluoride production. However, the presence of condenser 67 must certainly be considered in an apparatus of the nature of FIG. 2 for condensing hydrofluoric acid if large masses of scrap are fed into the body of hydrogen fluoride. The scrap presumably would be at a temperature at or above the boiling point of the hydrogen fluoride and consequently much evaporation of the latter would occur in cooling the charge down to the boiling point. Thus the hydrogen fluoride would be evaporated merely by the heat of the scrap, rather than the heat of the reaction. Therefore, until the stannous fluoride concentration in the vessel becomes high enough to raise the reaction solution boiling point and minimize the amount of hydrogen fluoride evaporated by heat of the scrap per se, the economics of the reaction in the system as shown in FIG. 2 are uncertain. Unless an arrangement for metering an amount of HF passed into the reactor in relation to an amount of HF-$SnF_2$ solution withdrawn is provided in the manner of FIG. 1, excessive quantities of hydrogen fluoride will inevitably evaporate. Additionally, without the positioning of a deep bed of scrap tin plate amoce the liquid level in the reactor as contemplated in FIG. 1 to react any HF in the hydrogen stream or means for charging the fresh plate through the rising HF vapors as also contemplated in the system of FIG. 1, the means of FIG. 2 could not be considered apt for $SnF_2$ production from tin plate.

*Batch $SnF_2$ Production With Cooled HF Body (FIG. 2)*

Alternatively, it is possible in the system of FIG. 2 to obtain the optimum batch production procedure for stannous fluoride production by the addition of tin particles to a body of liquid HF. Thus, with the liquid HF run into vessel 60 and cooled by jacket 63 to minus 15° C. or at least substantially below the boiling point of the HF under the pressures involved, the tin in dispersed particle form, the particles of the size order above considered, the reaction may be more adequately controlled than in our original application Serial No. 610,890, supra. With the condenser 67 operating to return the HF boiled off and with the initial cooling and subsequent reaction control through jacket 63, a very great degree of control may be achieved. The temperature must be permitted to rise with the addition of tin to the boiling point of the solution at the pressures of the reaction step for the reaction to take place.

An additional degree of control may be obtained in reaction of tin powder with HF in addition of HF to powder or vice versa in the FIG. 2 arrangement, by adding or providing originally a stannous fluoride-HF mixture of such a ratio as to markedly raise the boiling point of the liquid at the pressures of the reaction step. By this initial addition, coupled with the two temperature control means above mentioned (jacket and condenser), yet further control of the reaction is provided. If it is desired to employ a semi-continuous process in either case of addition, cold HF of the desired concentration can be periodically added to the liquid in the reaction step after withdrawal of the stannous fluoride enriched mixture in varying portions. Additionally, the HF may be added in the form of stannous fluoride-HF mixture of greater HF strength. Yet alternatively, the HF may be originally added or provided without stannous fluoride therein and temperature control and rate of tin addition in that variety of procedure carefully handled until the stannous fluoride percentage increases in the liquid body in the reactor so that the temperature control through the jacket 63 is not as critical and there is not as great a load on the condenser. From this stage on, the HF-stannous fluoride ratio may be controlled as desired by withdrawal of the stannous fluoride enriched mixture and addition of HF rich mixture of HF alone.

As previously indicated in the table, the reaction temperature varies from about 27° C. at 80 percent HF-20 percent stannous fluoride to about 57° C. at 20 percent HF-80 percent stannous fluoride.

*Continuous Stannous Fluoride Production With Tin Powder (FIG. 3)*

Referring to FIG. 3, at 80 is shown a reactor vessel having a heat exchange jacket 81 with input and output connections 82 and 83 mounted encircling the lower portion thereof, at least to a level above the liquid level to be established and maintained in the reactor. An electric motor or other suitable prime mover 84 drives in rotation shaft 85 having impellers 86 thereon to serve to agitate the liquid in the reactor 80. A vertical shaft 87 connects to an opening 88 in the upper end of reactor 80 and extends thereabove a sufficient distance to serve as a fluidizing bed for the suspension of tin particles as will be described. Shaft 87 connects at its upper end with disengagement box 88a. An enclosure 89 for a spiral conveyor 90 penetrates an opening 91 in box 88a and operates to move at a fixed rate tin powder or tin particles from reservoir 92. Reservoir 92 may be connected to any suitable source of tin powder. Conveyor 90 is mounted on a shaft 93 and is driven by any suitable conventional drive means.

A gas withdrawal line 94 is taken from the top (otherwise sealed) of box 88a and passes to a juncture from which lines 95 and 96 depart. Line 95, controlled by valve 97, passes to scrubber 98. Water is input to scrubber 98 through line 99, while hydrogen, carbon dioxide and noncondensable gases are taken off above through line 100. $Na_2CO_3$ is input to the discharge chamber of scrubber 98 through line 98 through line 101, while $NaHF_2$ solution is withdrawn through line 102.

Line 96 is a recycle line for hydrogen to be passed through gas pump 103 (schematically indicated) in an amount depending on the requirement for fluidization in shaft 87. The recycle gas is passed through line 104 to an opening 105 adjacent the lower end of shaft 87.

A hydrogen fluoride reflux condenser 106 has brine input and output connections 107 and 108. Line 109 from reactor 80 passes to one header 110 of condenser 106 from which the HF is passed through the heat exchange tubes of the condenser and to the second header 111. From second header 111 liquid HF is recycled through line 112 to an opening 113 adjacent the upper end of reactor 80, while hydrogen with some HF is passed overhead through line 114 to join line 96 before gas pump 103. Valve 115 controls flow through line 114.

Withdrawal fitting 116 passes 90 percent stannous fluoride–10 percent HF at approximately 62° C. to line 117 and from thence to steam jacketed scraper type evaporator crystallizer 118. Evaporator crystallizer 118 has jacket 119 with conveyor 120 therein. The stannous flouride crystals, advanced by conveyor 120, are removed through fitting 121. HF vapors are passed above through line 122, which is joined by HF feed line 123 and passes to HF condenser 124 having brine connections 125 and 126. From condenser 124, HF liquid is passed by line 127 through opening 128 in reactor 80 slightly above the fixed liquid level in the reactor.

Referring to the process in FIG. 3, finely divided tin is fed into box 88a through reservoir 92 and conveyor 90 to provide a continuous metered flow of tin particles of the critical particle size previously discussed. (The following description will be for the continuous method after the process has reached equilibrium.) Various methods may be employed to cool the feed tin. Thus, conveyor flight 90 may be hollow with a cooling medium circulated therethrough or a cooled gas may be passed through the feed tin in reservoir 92 before it is fed. This gas may be the hydrogen produced by the reaction after it is free of HF. It is possible that the tin powder be fed at room temperature, depending on three factors. (1) The amount of particle separation caused by the gases passing countercurrent to the tin feed in shaft 87. (2) The concentration of HF in the gases in shaft 87. (3) The temperature of the gases in shaft 87. The critical factor involved is that the tin particles must be kept from clinkering by maintaining a low temperature or adequate separation.

The fluidizing equipment itself is not unique, that is, conventional equipment may be employed to provide the countercurrent fluidizing flow at the critical position relative to the reactor 80. Hydrogen and HF pass through the HF reflux condenser 106 and are cooled, condensing most of the HF. The HF returns to the reactor through line 110 and the cold hydrogen along with some HF (depending on the latter's vapor pressure) is pumped into the fluidizing chamber via lines 114, 96 and 104. If this quantity of hydrogen is insufficient to properly fluidize the tin powder, additional hydrogen going to the scrubber 98 may be recycled as required through line 96.

Agitation in reactor 80 is controlled so that the vertical turnover is zoned to each propeller, and not from top to bottom of the reactor. In other words, contents of the reactor are not homogeneous. A top temperature of about 10° C. is maintained to prevent excessive vaporization of HF. The 90 percent $SnF_2$–10 percent HF withdrawal through fitting 116 and line 117 and crystallization of stannous fluoride from the liquid stannous fluoride-HF mixture is carried out in the same manner as in FIG. 1. The scrubbing equipment is also the same.

The three basic differences between the process of FIG. 3 and that of FIG. 1 are as follows:

(1) It is necessary that the 90 percent stannous fluoride–10 percent HF mixture be taken off the opposite end of the tin feed from that of FIG. 1 in the process of FIG. 3 in order to prevent tin particles from going along with the $SnF_2$-HF mixture. This problem does not occur in FIG. 1 with the tin plate because the plate strips are too large to flow with the stannous fluoride-HF mixture and the tin will not come off the steel until it is dissolved by the HF to produce stannous fluoride.

(2) The identical principle of passing hydrogen through the tin feed to remove the last traces of HF from the hydrogen discharging from the reactor is applied in both FIG. 3 and FIG. 1. However, there is no problem of keeping the tin suspended in the gas stream when tin plate is used in FIG. 1. In the FIG. 3 design of the tin feed section, it is necessary to provide the fluidizing procedure shown so that the hydrogen may be employed to suspend the tin particles to prevent clinkering thereof.

(3) An HF reflux condenser is shown in FIG. 3, although not in FIG. 1. Most of the heat of reaction is utilized in raising the temperature of the stannous fluoride-HF mixture from 10° C. at the level of entry 129 of the particles to the liquid to 60° C. at fitting 116, or removed by the cooling jacket. However, some HF vaporizes. Condenser 106 is employed to condense as much of the HF as possible out of the hydrogen and also to cool the hydrogen to be used in fluidizing the feed tin.

Comparing FIG. 3 to the operation of FIG. 2, there are at least two main improvements. Thus, the HF losses are substantially reduced from about 40 percent to approximately 5 percent. Secondly, a good portion of the heat of reaction is utilized in concentrating the stannous fluoride-HF mixture, thereby eliminating some of the refrigeration and steam requirements.

It should be appreciated that the quantity of tin fed depends upon the volume of the reactor 80. The particle size must be within the critical limits previously mentioned. The HF must be of substantially anhydrous concentration, that is, 70 percent or over. Gas flow in shaft 87 is controlled so as to so suspend the tin particles as to avoid clinkering in the gas exhaust through opening 88. The capacity of condenser 106 is adjusted to remove substantially all the HF and recycle it. New HF feed through line 123 is so metered relative to the recycle HF vapors through line 122 and line 112 as to precisely counterbalance the consumption of HF in the reaction as measured by the exhaust of hydrogen ultimately through line 100 and withdrawal of stannous fluoride crystals through fitting 121. Rotation of agitators 86 so controls the circulation of liquid in the liquid body 129 as to provide three separate zones of graded temperature ranging from the top temperature approximating 10° C. to the bottom temperature of 62° C. at withdrawal fitting 116. The temperature may be sensed by conventional means adjacent the top of the liquid body and additional heat or cooling applied through jacket 81 to provide the desired gradient. By providing the stannous fluoride concentration high relative to the HF in the liquid body, the evolution of HF is minimized. Temperature control also may be exerted relative to the tin powder feed, as described previously.

In initiating the process of FIG. 3, the HF is added to reactor 80 and cooled in the manner of the process of FIG. 2. (When that apparatus is used in the addition of tin to a precooled body of HF.) This initial body of liquid may also be a stannous fluoride rich solution analogous to the operations previously described. Tin powder, precooled or not, is then added in such quantity and at such rate as to initiate the reaction and adjust the stannous fluoride concentration to that desired in the liquid body. Once the evolution of HF is begun due to the initiation of the reaction, and recycle of HF is commenced from condenser 106, fluidization may be begun and the process entered into with HF metered in and stannous fluoride enriched solution moved through fitting 116.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of producing stannous fluoride by reacting hydrogen fluoride and tin in a reaction step comprising the steps of first cooling a quantity of liquid hydrofluoric acid of greater than 70 percent concentration to a temperature substantially below the boiling point of the hydrofluoric acid at the pressures of the reaction step, said liquid HF cooled to a temperature sufficiently below the boiling point of liquid HF at the pressures of the reaction step to prevent any reaction with tin upon contact therewith, then rapidly adding together the HF and a quantity of relatively finely divided tin in a reaction step in such manner as to quickly submerge and immerse said quantity of tin to be reacted with the HF whereby to avoid an initial swift generation of heat, then permitting the temperature of the reaction mixture to rise to the temperature of the boiling point of the solution at the pressures existent in the reaction step whereby to permit the reaction of the tin and the acid, maintaining the reaction step at least substantially in its entirety at a substantially uniform temperature not greater than the boiling point of the liquid present in the reaction step, by maintaining a sufficient excess of liquid hydrofluoric acid continuously present in the reaction step and in contact with at least substantially all of the tin reacting in the reaction step, whereby to at least substantially prevent any agglomeration of the tin into unreactive metallic bodies in said reaction step due to fusion thereof in the presence of excess heat, and recovering stannous fluoride from the resultant solution.

2. A method as in claim 1 wherein the liquid HF is substantially anhydrous.

3. A method as in claim 1 wherein the tin is added to a cooled body of liquid HF in a reaction vessel.

4. A method as in claim 1 wherein the tin is in the form of a plated layer on metal inert to the action of HF under the conditions of the said reaction step.

5. A process of producing stannous fluoride by reacting hydrogen fluoride and tin in a reaction step comprising the steps of first cooling a quantity of liquid hydrofluoric acid of greater than 70 percent concentration to a temperature substantially below the boiling point of hydrofluoric acid at the pressures of the reaction step, the liquid HF cooled to a temperature sufficiently below said boiling point of the HF at the pressures of the reaction step to substantially prevent any reaction of tin upon contact with it, then rapidly adding together a quantity of relatively finely divided metallic tin with said HF in a reaction step in such manner as to quickly submerge and immerse said quantity of tin to be reacted with the HF whereby to avoid an initial swift generation of heat, then permitting the temperature of the reaction mixture to rise to the temperature of the boiling point of the HF at the pressures existent in the reaction step whereby to permit the reaction of the tin and the acid, permitting the reaction to proceed until the $SnF_2$-HF ratio in the liquid present in the reaction step rises to where no more $SnF_2$ is present than in a 90 percent $SnF_2$–10 percent HF by weight mixture, adding fresh HF and withdrawing $SnF_2$-HF mixture as required to maintain the $SnF_2$-HF mixture present in the reaction step contacting tin at no higher than 90 percent $SnF_2$ in the liquid, maintaining the reaction step at least substantially in its entirety at a substantially uniform temperature not greater than the boiling point of the liquid present in the reaction step, by maintaining a sufficient excess of liquid $SnF_2$-HF mixture of the given ratio continuously present in the reaction step and in contact with the tin to substantially prevent any agglomeration of the tin into unreactive bodies and recovering stannous fluoride from the withdrawn solution.

6. A process as in claim 5 including continuously adding quantities of extra tin as $SnF_2$-HF mixture is withdrawn.

7. In a method of producing stannous fluoride by reacting hydrogen fluoride and tin, the steps of mixing liquid hydrogen fluoride in a concentration of greater than 70 percent with relatively finely divided metallic tin in the form of a relatively thin plated layer on metal inert to HF under the conditions of the reaction in a reaction step, the HF initially cooled to a temperature substantially below the boiling point of liquid HF at the pressures of the reaction step, and maintaining liquid HF of greater than 70 percent concentration in contact with the tin plate in said reaction step whereby to dissolve tin from the plated metal and produce a stannous fluoride-containing liquid body, the quantity of liquid present in the reaction step sufficient to maintain a substantially uniform temperature not over the boiling point of said liquid in the reaction step, and recovering stannous fluoride from the resultant solution.

References Cited in the file of this patent

UNITED STATES PATENTS

| | | |
|---|---|---|
| 1,148,194 | Siefert et al. | June 27, 1915 |
| 1,402,318 | Rodebush | Jan. 3, 1922 |
| 2,919,174 | Pring | Dec. 29, 1959 |
| 2,924,508 | Gilliland et al. | Feb. 9, 1960 |

OTHER REFERENCES

Du Pont, "Lucite" Manual, page 115 (1942).

Ellis: Chemistry of Synthetic Resins, pages 153, 154, and 237 (1935), Reinhold Publishing Corp., N.Y.

Elliott et al.: "Journal of American Chemical Society," vol. 74, page 5050 (October 1952).

Friend: "Textbook of Inorganic Chemistry," vol. 5, page 343 (1917). Green and Co., Ltd., London.